(12) United States Patent
Tilby

(10) Patent No.: US 7,055,907 B1
(45) Date of Patent: Jun. 6, 2006

(54) LIGHT WEIGHT TRANSPORTABLE CHAIR

(76) Inventor: John V. Tilby, 9352 S. 670 West, Sandy, UT (US) 84070

(*) Notice: Subject to any disclaimer, the term of this patent is extended or adjusted under 35 U.S.C. 154(b) by 0 days.

(21) Appl. No.: 11/029,143

(22) Filed: Jan. 5, 2005

(51) Int. Cl.
*A47C 7/00* (2006.01)

(52) U.S. Cl. .................. 297/380; 297/228.11; 297/224; 297/382

(58) Field of Classification Search ............... 297/380, 297/381, 382, 175, 176, 177, 178, 179, 461, 297/462, 219.1, 225, 228.11, 224
See application file for complete search history.

(56) References Cited

U.S. PATENT DOCUMENTS

| 2,919,169 | A | * | 12/1959 | Jackson ...................... 297/461 |
| 3,114,574 | A | * | 12/1963 | Pryale ...................... 297/183.2 |
| 4,846,076 | A | * | 7/1989 | Menges et al. ............... 108/42 |
| 6,655,734 | B1 | * | 12/2003 | Hunter et al. ............ 297/219.1 |
| 6,695,410 | B1 | * | 2/2004 | Hsia ......................... 297/452.4 |

* cited by examiner

*Primary Examiner*—Anthony D. Barfield

(57) ABSTRACT

A light-weight easily transportable chair having a fabric foam plastic seat, a fabric covered foam plastic seat back and a hinge interconnecting said seat and said back and a flexible fabric skirt fixed to the bottom of the seat, the skirt extending over the top of a bucket and secured to the bucket and with support braces on the bottom of the seat to rest on the top of the bucket.

6 Claims, 4 Drawing Sheets

Figure 1:
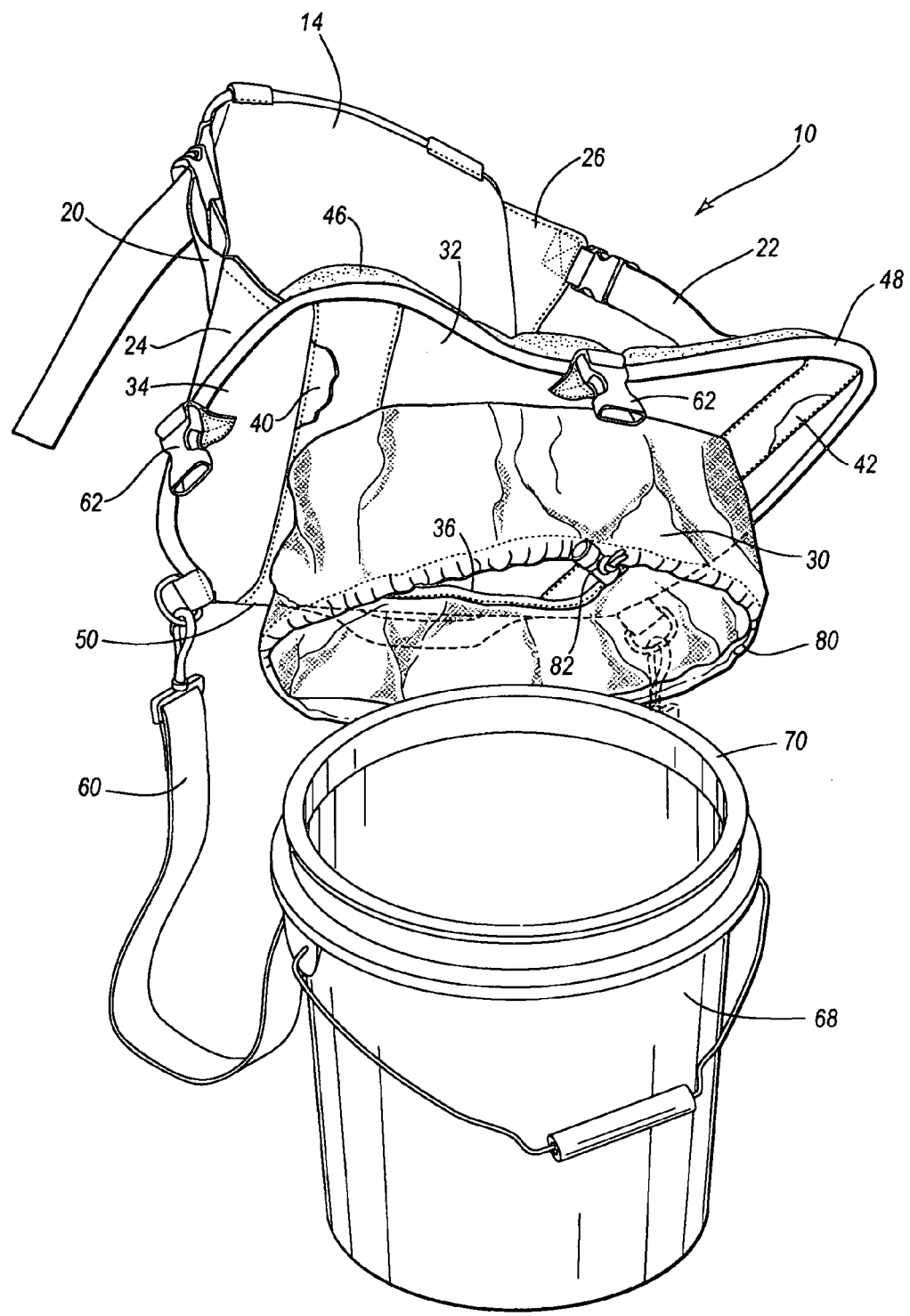

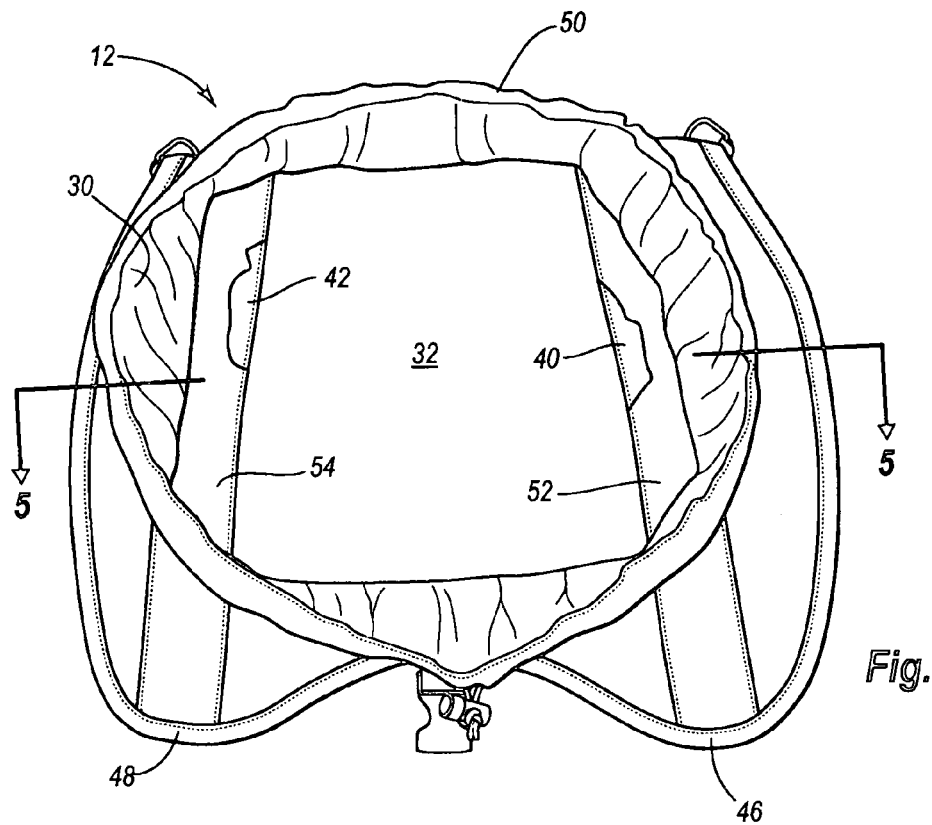
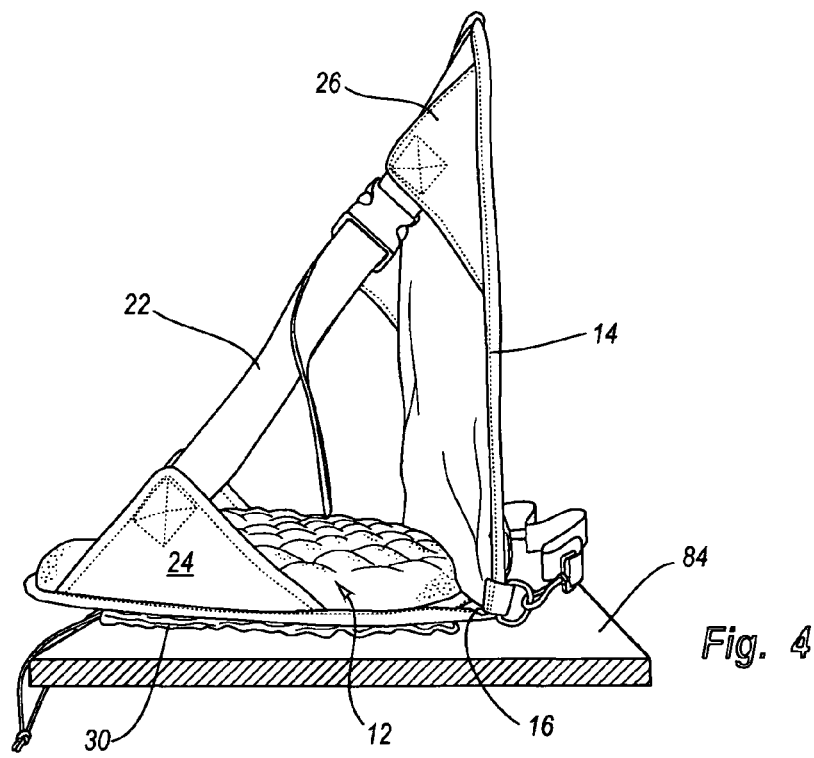

LIGHT WEIGHT TRANSPORTABLE CHAIR

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO MICROFICHE APPENDIX

Not Applicable.

BACKGROUND OF THE INVENTION

Field of the Invention

This invention relates to chairs, particularly chairs that can be readily used by hunters, fishermen, sport spectators, parade watchers and others desiring an easily transported, readily set-up comfortable chair.

It has been found that there is a need for a light-weight chair that can be easily transported by an individual participating in outdoor activities. For example, hunters frequently need such a chair as they set-up near a game trail to wait game being hunted. Fishermen, often have a need for such a light-weight, easily transported chair for use in boats and when bank and ice-fishing. Other persons have a need for such a chair to use while watching sport activities, such as little league athletic contests played on fields that do not include spectator seats. Also, people watching parades, or involved in other activities, frequently need such a chair to be comfortable while watching the event taking place.

Frequently, also, the same persons needing a light-weight transportable chair need to be able to transport additional gear and/or food, or beverages, that will be used during the time the individual spends sitting on the chair. For this reason, the people using such light-weight, easily transportable chairs frequently carry a bucket containing the other articles that they may desire to use. In the case of hunters and fishermen, the bucket may also be used to carry game or fish away from the site of use of the chair.

Users of light-weight easily transported chairs also may desire to use them to provide more comfortable seating on beaches or other flat surfaces.

BRIEF SUMMARY OF THE INVENTION

Objects of the Invention

A principal object of the present invention is to provide a light-weight, easily transportable seat and seat back that can be used with a variety of support bases to form a chair.

Other objects are to provide a light-weight folding seat and chair combination that will attach to either a closed or open top of a standard bucket, with or without a lid, and that will also rest on flat support surfaces to be used as a chair, if so desired.

Features of the Invention

Principal features of the invention include a flat seat and a seat back that is hinged to a rear edge of the seat and with strap members to maintain the relationship of seat and seat back. A flexible fabric skirt member forms a ring that depends from and is secured to a bottom surface of the seat. The skirt member includes a peripheral sleeve through which a resilient cord is inserted and clamping means are provided to secure opposite ends of the cord together. The skirt member, made of a flexible fabric material, will fit over a closed or open top of a standard bucket. The skirt member will conform to the shape of the wall bucket and will be secured to the wall of the bucket.

The seat and back are made of a light-weight foam plastic material and reinforcement support members are secured to the bottom surface of the seat and are positioned to engage the upper rim of an open topped bucket over which the skirt member is secured.

Prior Art

Various types of "stadium chairs" have been proposed in the past. Generally, such stadium chairs include a seat and a seat back, hinged to a rear edge of the seat. Braces or straps are used to hold the seat back in an upright position with respect to the seating surface of the seat and to insure back support for a person sitting on the seat. Such stadium chairs may also include hooks beneath the front edge of the seat so that the hooks will engage the lip of a bench on which the stadium seat is positioned. The stadium seats are generally intended for use by spectators observing sporting events, but they may also be used for many other purposes.

It has been found that "stadium chairs", as described, if made sufficiently light-weight, can be easily transported for use by hunters, fishermen, parade spectators and others who can place them for use on any suitable support structure. It is also well recognized that the same individuals may desire to carry a number of other articles, such as ammunition, fishing gear, clothing items, food, or drinks, to the site where the transportable chair is to be used. Frequently, such items are carried in a bucket and are then removed from the bucket at the site of use. The transportable seat and seat back, may then be positioned over the top of the bucket whether or not the bucket is provided with a lid.

To insure continued positioning of the seat and seat back on a bucket, the present invention incorporates a depending sleeve that will fit around the top opening of the bucket. Because the sleeve is made of a flexible material, it will conform in shape to the top of any bucket that may be used.

The skirt further includes a sleeve through which a resilient cord is passed and with means for securing the ends of the cord after it has been pulled tightly around the outer wall of the bucket.

The flexible sleeve will also compact beneath the bottom surface of the seat and will lie on a flat surface upon which the seat and seat back is positioned for use.

Support braces extending across the bottom of the seat are arranged to engage the top lip of an open tapped bucket to provide additional strength to the seat and to keep the seat from caving into the bucket.

Additional objects and features of the invention will become apparent to persons skilled in the art to which the invention pertains from the following detailed description and claims.

BRIEF DESCRIPTION OF THE FIGURES OF THE INVENTION

In the Drawings

Figure 2:
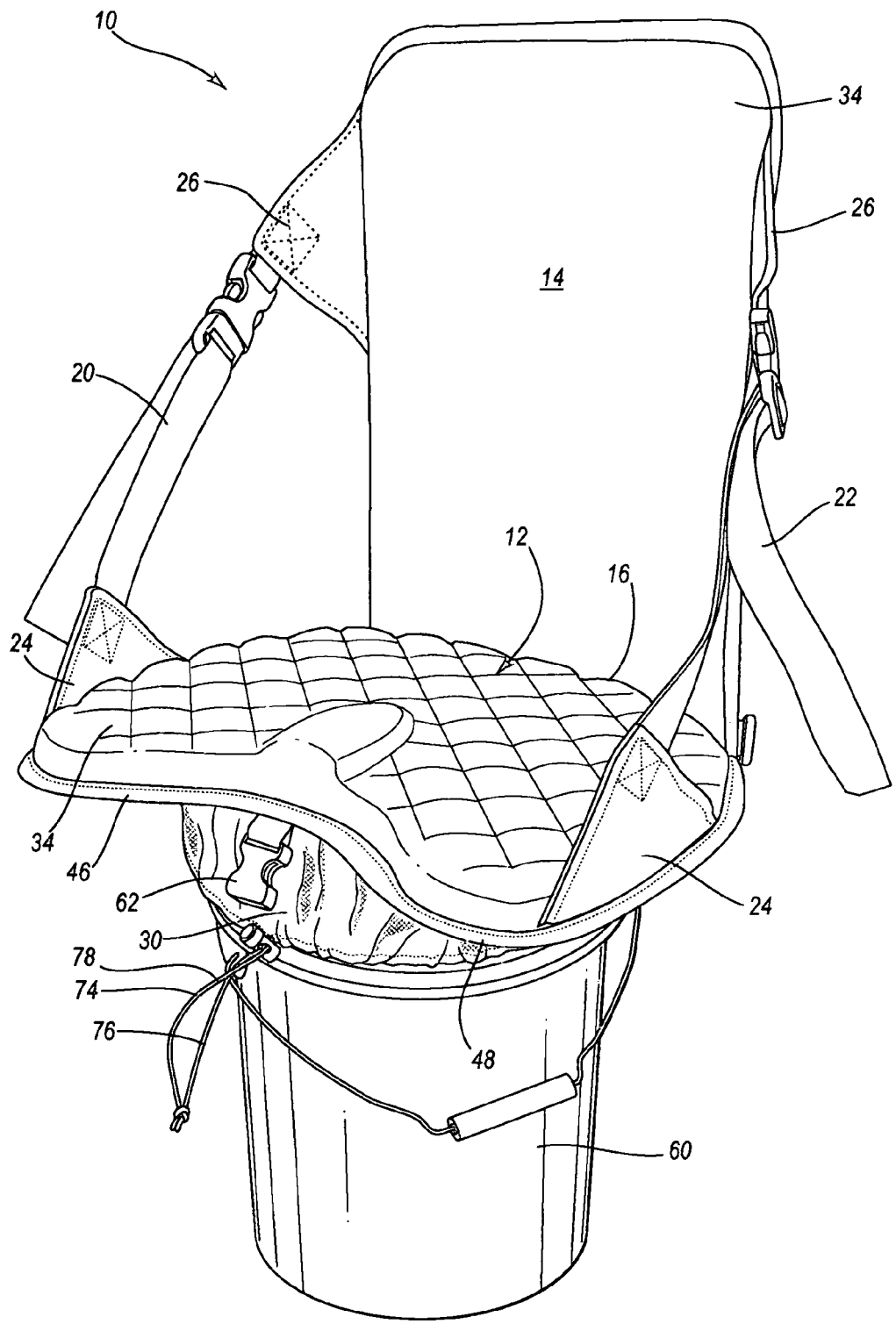

FIG. 1 is an exploded perspective view of a light-weight seat and seat back of the invention, positioned above an open round topped bucket on which the seat may be positioned;

FIG. 2, a similar view showing the seat and seat back positioned on the top of a bucket;

FIG. 3, a bottom plan view of the seat of the invention;

FIG. 4, a vertical section, taken on the line 4 of FIG. 3; and

Figure 5:
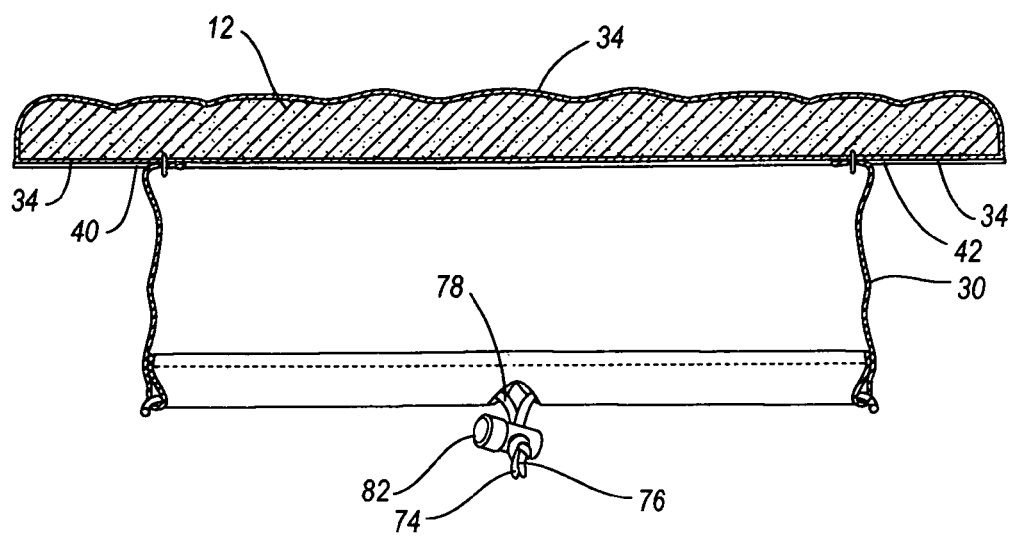

FIG. 5, a side elevation view of the seat and seat back positioned to sit on a flat surface.

DETAILED DESCRIPTION

Referring now the Drawings

In the illustrated preferred embodiment, the light-weight transportable chair, shown generally at 10, includes a chair seat 12 and a chair back 14 hingedly connected at 16.

Straps 20 and 22 each interconnect a conventional attachment tab 24 at the front side of the seat 12 and another cooperating attachment tab 26 at the top side of the seat back 14.

A skirt 30 projects downwardly from a bottom 32 of the seat 12. The skirt 30 is sewn to a fabric 34 as shown by seams 36. Fabric 34 covers the seat 12 and the seat back 14 and the portion of the fabric 34 interconnecting the seat and seat back forms the hinge 16.

A pair of support braces 40 and 42, made of aluminum strap material, or the like, each extend from a front outer edge 46 and 48 of the seat 12 and inwardly across the bottom 32 to a rear edge 50 of the seat. The support braces are each secured in place with an overlying strip 52 and 54 of strong, durable fabric, such as nylon or reinforced nylon.

The angular positioning of the support braces positions the support braces to extend inwardly of the attached skirt 30 and such that the support straps will rest on the top of a bucket lid, or on the rim of an open topped bucket.

A shoulder carry strap 60 has its ends releasable attached to connectors at opposite sides of the seat at hinge 16. Straps 60 allows the chair seat and back to be carried with the strap slung over a shoulder to allow the user's hands to be free to carry a bucket.

Also, connectors 62 may be provided at the edge of seat 12 for the attachment of storage bags, not shown.

When the chair seat 12 and chair back 14 are to be used as a set of a bucket chair, the skirt 30 is pulled over the top rim 66 of a bucket 68. The bucket may have a lid thereon or may be open topped. If the bucket has a lid, the fabric covered support braces 40 and 42 will rest on the bucket lid. If the bucket is open topped, the support braces 40 and 42 will rest on the top rim 70 of the bucket.

Skirt 30 is pulled over the top of bucket 68 and is secured in place by pulling on the opposite ends 74 and 76 of an elastic cord 78 pulled through a sleeve 80 formed in a bottom edge of the skirt. A conventional spring loaded clamp 82 holds the ends of the cord when the cord is tight around the bucket.

When the chair seat 12 and chair back 14 are to be used as a stadium seat, as shown in FIG. 5, the skirt collapses to be between the chair seat and a flat surface 84 on which the seat and back are positioned.

Although a preferred embodiment of my invention has been herein described, it is to be understood that the present disclosure is by way of example and that variations are possible without departing from the subject matter coming within the scope of the following claims, which subject matter I regard as my invention.

I claim:

1. A light-weight, transportable chair comprising
    a foam plastic seat and a foam plastic seat back;
    a fabric covering said seat and said back and forming a hinge between said seat and said back;
    a skirt fixed to a bottom of said seat and projecting from said seat to fit over a top of a bucket; and
    means to tighten and hold an end of said skirt remote from said seat around a bucket.

2. A light-weight, transportable chair as in claim 1, further including
    support braces fixed to the bottom of the seat, said support braces being positioned to engage the top of a bucket to which the skirt is attached.

3. A light-weight, transportable chair as in claim 2, further including
    strap means interconnecting the seat and the back at opposite sides of said seat and said back.

4. A light-weight, transportable chair as in claim 3, further including
    a shoulder carrying strap with opposite ends attached to the seat adjacent to opposite ends of the hinge.

5. A light-weight, transportable chair as in claim 2, wherein
    the support braces are strips of aluminum covered by a strong fabric material.

6. A light-weight, transportable chair as in claim 5, wherein
    each of said support braces extends from a front edge of the seat and adjacent a side of said seat inwardly across the bottom of the seat to adjacent a rear edge of the seat and adjacent to the center of said rear edges.

* * * * *